No. 895,288. PATENTED AUG. 4, 1908.
A. McKENZIE.
VOTING MACHINE.
APPLICATION FILED JAN. 13, 1900.

Witnesses:
L. C. Hills
Percy C. Bowen

Inventor:
A. McKenzie,
By Wilkinson & Fisher
Attorneys

No. 895,288. PATENTED AUG. 4, 1908.
A. McKENZIE.
VOTING MACHINE.
APPLICATION FILED JAN. 13, 1900.

Inventor:
A. McKenzie,
By Wilkinson & Fisher.
Attorneys

Witnesses
L. C. Hills
Roy C. Bowen

No. 895,288. PATENTED AUG. 4, 1908.
A. McKENZIE.
VOTING MACHINE.
APPLICATION FILED JAN. 13, 1900.

UNITED STATES PATENT OFFICE.

ANGUS McKENZIE, OF JAMESTOWN, NEW YORK, ASSIGNOR, BY MESNE ASSIGNMENTS, TO U. S. STANDARD VOTING MACHINE CO., OF ROCHESTER, NEW YORK, A CORPORATION OF NEW YORK.

VOTING-MACHINE.

No. 895,288.  Specification of Letters Patent.  Patented Aug. 4, 1908.

Continuation of application Serial No. 726,458, filed August 7, 1899. This application filed January 13, 1900. Serial No. 1,336.

*To all whom it may concern:*

Be it known that I, ANGUS McKENZIE, a citizen of the United States, residing at Jamestown, in the county of Chautauqua and State of New York, have invented certain new and useful Improvements in Voting-Machines; and I do hereby declare the following to be a full, clear, and exact description of the invention, such as will enable others skilled in the art to which it appertains to make and use the same.

My present invention relates to voting machines, particularly to that general type described in the patents to Davis, 526,668 and 549,101, in which machines the voting mechanisms are positively actuated throughout.

This application is a continuation or reproduction of my former application Serial No. 726,458, filed August 7, 1899.

By my improvements, the construction of the voting booth is greatly simplified, and the machine and its booth are more readily set up for the purpose of voting and taken apart again for shipment, and I further provide means whereby, when the machine is detached from the turn stile, the indication of the registers on the machine may be secured against being changed from any cause whatever, and for these and other purposes the invention consists of certain improvements hereinafter fully described, the novel features being pointed out in the claims at the end of this specification.

In the accompanying drawings, Fig. 5 is a view on the same sectional line as Fig. 4, the keys and counters and interlocking rods being shown locked by the resetting bar.

Figure 1:
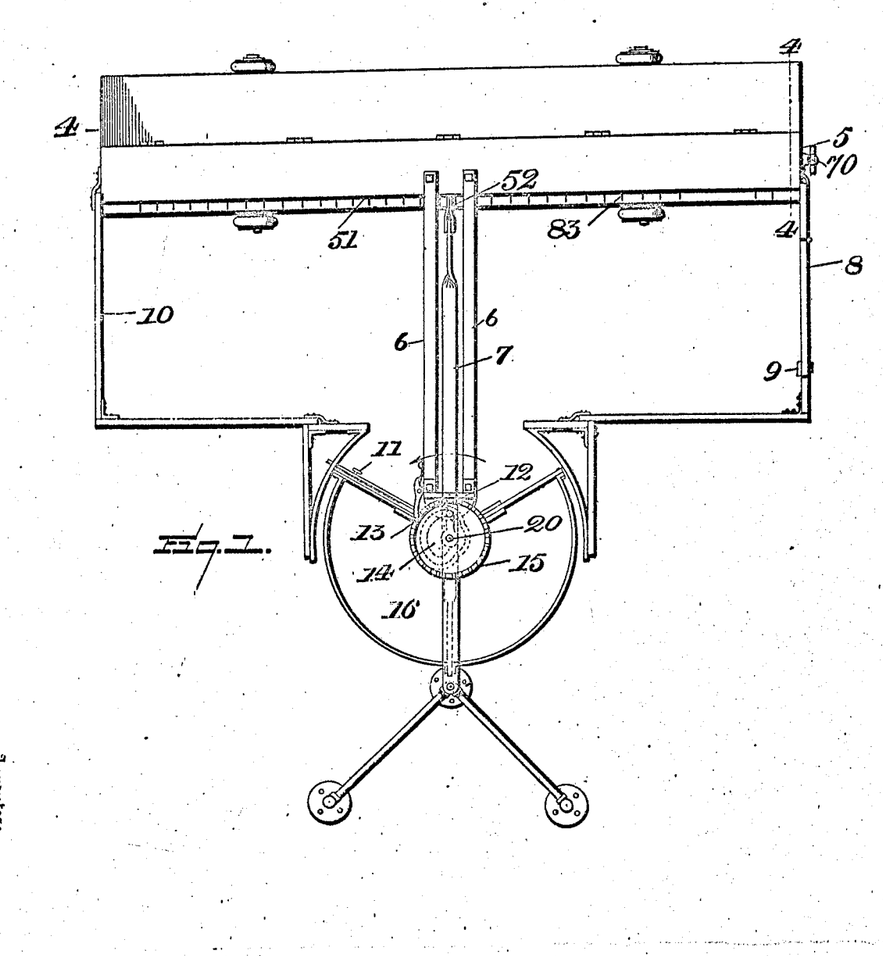
Figure 1 represents a plan view of my machine and booth and turn stile, the turn stile being in a position in which the voter would leave it when he has gained access to the machine.

Reference numbers 4 and 5 refer to the casing of a voting machine, which machine is set up in connection with a booth, 10 and a turn stile 15. At the right hand end of the turn stile in Fig. 1 is shown a door, 8, to the booth, which is held closed by the lock 9. The turn stile stands in the middle of the front of the booth, which is left open to permit entrance and exit to and from the booth through the turn stile. The stile is carried on a shaft, 20, which is fastened to the floor of a room in which the election is held, in any suitable manner, and which is braced at the top from the voting machine by suitable braces 6, 6, shown in Fig. 1. The shaft of the turn stile carries three wings which are of sufficient breadth to fill the opening between the shaft and the curved sides of the booth in which the stile stands, and they are of sufficient height so that a person standing outside of the booth cannot see over or under them to witness the operation of the machine by the voter within the booth. One of the sides of the turnstile carries the latch 11, which holds the stile in the position in which the voter leaves it when he comes out of the booth and is to be lifted by the inspector to allow the stile to be turned to the entrance position to allow another voter to enter the booth.

The top of the shaft of the turn stile carries a ratchet ring, with which a pawl carried in any suitable manner by a stationary part connected with the booth, engages to prevent backward rotation of the turn stile. Near the top of the turn stile is carried a cam plate which has two active portions, and two idle portions, the active portions being quick action cams for the purpose of reciprocating the bar 7, and the idle portions are for the purpose of holding the bar 7 stationary during the time that the pin which is carried by said bar is in the idle portion of the groove. The idle portions of the cam are concentric with its center, but with different radii, so that the bar is held in a different position by each idle portion, the position in each case being the position to which it is moved by the active cam which immediately precedes it.

Figure 2:
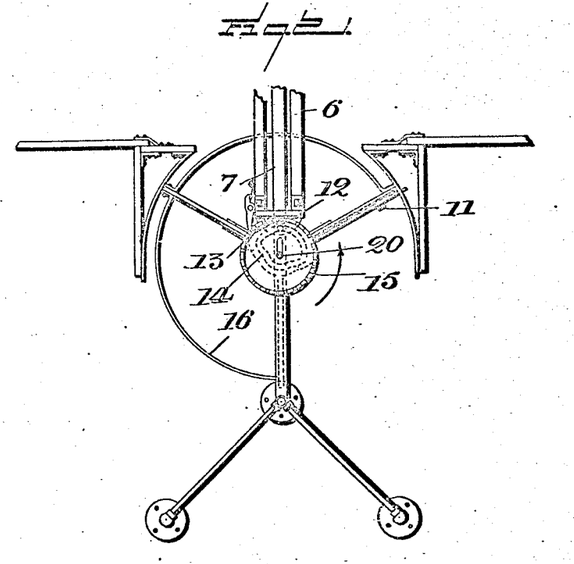
Fig. 2 represents a plan view of the turn stile, the turn stile being in the position in which the voter would find it before going into the machine.
Figure 3:
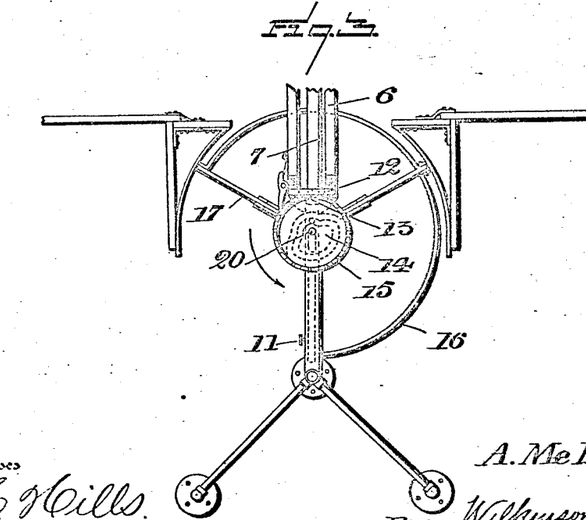
Fig. 3 represents a plan view of the turn stile, the stile being in the position in which the voter would leave it when he has come out from the booth.

In the operation of the machine, the voter finds the turn stile in the position shown in Fig. 3, in which position the voting mechanisms on the machine are all locked against operation and this includes the keys, counters and interlocking rods, so that none of these parts could be operated even if access were gained to them. The inspector raises the latch, 11, and the voter rotates the stile to the position in which it is shown in Fig. 2, and, by means of this rotation, the bar 7 is moved by the quick acting part of the cam toward the machine, which action operates to unlock it, and it is held in this unlocked position by reason of the idle portion of the cam engaging with the pin on the bar 7, as shown in Fig. 2. The voter can now rotate the stile to the position shown in Fig. 1, when he can get into the booth, operate the keys on the machine according to the ballot which he wishes to cast, and, having finished it, he can then go into the revolving stile, again lift the latch 11 and rotate the stile to let himself out of the machine again.

It will be noticed in Fig. 1 that the position in which the stile is left while the voter is voting is the position in which the quick acting cam which operates to reset and lock the machine is just about to come into play, so that when the voter starts out of the booth the cam begins to operate at once and resets and locks the machine before the voter can get out of the booth. This quick acting cam operates completely in an arc of about forty degrees or less, so that it will be seen that before the voter can get out of the booth he must reset and lock the machine. Thus, it will be seen that, by pulling the bar 7 away from the machine, the machine is reset and locked, and, by pushing it toward the machine the latter is unlocked for the purpose of voting. The means by which this is accomplished will be fully understood by reference to Figs. 4 and 5. The bar 7 extends toward the machine and has a pivoted and detachable connection with the bar 52, with which it coöperates to perform its functions on the machine.

Figure 4:
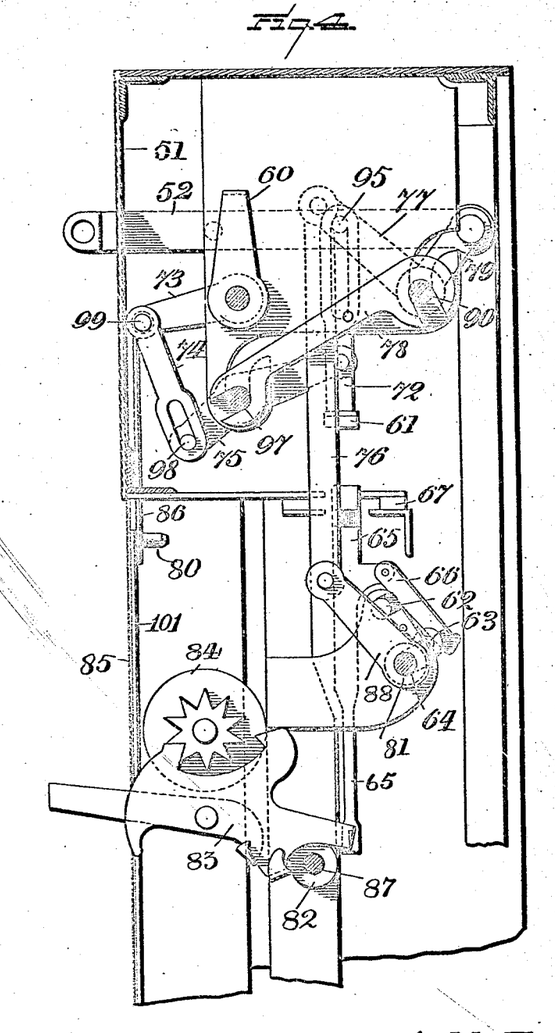
Fig. 4 represents a cross-section on the line 4, 4, in Fig. 1, the parts which are operated by the voter being shown unlocked by reason of the resetting bar 61 being shown in an elevated position.

The bar 52 extends through a slot in the casing, which slot serves as a guide for it and its inner end is pivoted to a bell crank lever, 79, which is pivoted on a shaft, 90. The other arm of the bell crank lever 77 has a pivoted engagement with the link 76, through which it locks the arm 88 and the shaft 64 of the trip device, by means of which the voting mechanisms which have been operated by the voter are unlocked preparatory to being reset. The arm 77 also carries a pin 95 which travels in a slot in the part 72, on the lower end of which is carried the resetting bar 61. When the bar 52 is pulled out, the bell crank 79, 77 is rocked and the link 76 begins to descend at once to release the voting mechanisms voted, which are fully released before the pin 95 has descended to the bottom of the slot in the part 72. When the pin 95 reaches the bottom of the slot, it forces the bar 61 down and forces the interlocking rods back to place. The construction of these parts may be according to any improved design. Thus, the connection between the bar 52 and bell crank 79 may be a shaft which runs the whole length of the machine, and there may be a bell crank at each end of the shaft, by means of which the shaft 64 and the bar 61 will be operated evenly at both ends, and it is some such construction as this which I prefer. When the arm 77 rocks and carries the bar 61 down with it, the lever 75 is rocked at the same time, by reason of a pivoted connection between it and the part 72. This lever 75 is pivoted on the shaft 97, and on its end carries the pin 98, which travels in a slot in a link 74. This link 74, is in turn pivoted to the bell crank lever 73, 60 for a reason which I will now describe.

Figure 6:
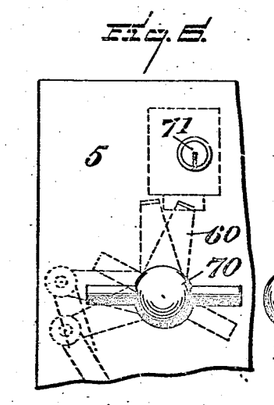
Fig. 6 is a view of the right hand end of the machine in Fig. 1, in which is shown a lock so placed as to secure the resetting and locking bar in its locked position.

Fastened to a shaft 99, which connects the arm 73 and the link 74, is a strap, 86, which by the pin 80 is connected to the slide, which is moved for the purpose of exposing the counters, and this movement is effected by drawing the handle 70, shown in Fig. 6, from the full line position to the dotted line position.

It will be noted in Fig. 5 that the pin 98 is at the top of the slot in the link 74, and, if now the handle 70 is rotated for the purpose of exposing the count, the link 74 will be drawn up so that the pin 98 will rest in the bottom of its slot; and if now the link 74 is locked in its upper position, it will be impossible to rotate the lever 75 to raise the resetting and locking bar 61, and, in consequence, while the machine is open for the purposes of taking the count off of the machine, it will be impossible to raise any of the interlocking rods and operate any of the keys or their counters. All of the keys and counters and interlocking rods on the machine will thus be held positively locked against operation while the count is being taken off of the machine.

Figures 7, 8:
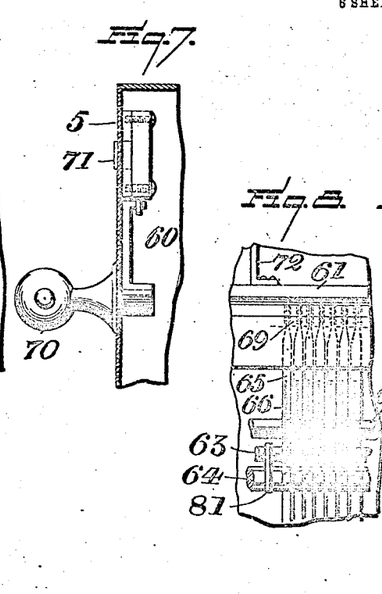
Fig. 7 is a sectional elevation of Fig. 6.
Fig. 8 is an elevation of the interlocking system, the resetting and locking bar 61 being shown in its locking position.

The means which I employ for the purpose of holding the link 74 up is shown in dotted lines in Fig. 6, and in full lines in Fig. 7. In Fig. 6, which is an elevation of the end of the right hand end of the machine shown in Fig. 1, I show a lock in dotted lines, with a key hole therefor, 71, and a handle immediately below, 70. This lock may be any ordinary lock or a spring lock. If it is not a spring lock, then, in order to expose the count on the registers of the machine, the judge or one of the election officials will have to unlock the lock 71 in order to turn the handle 70. It is obvious, by reference to Figs. 4 and 5, that the judge will not be able to turn the handle 70 until the machine has been reset and the keys and counters and interlocking rods have been locked. The judge can then, by unlocking the lock 71, rotate the handle from the left hand position in Fig. 6 to the right hand position or beyond and lock the lock again, which will securely hold the voting mechanisms from being tampered with.

If the parts of the machine are as shown in Fig. 4, with the bar 52 disconnected from the barrier mechanism, the shutters cannot be raised by turning the knob 70 without at the same time locking the counters through the counter-actuators, because the turning of the knob 70 will raise the left hand end of the lever 75, forcing down the parts 72 and 61.

If desired, I may use a spring lock instead, so that it will not be necessary to use a key to unlock this lock, but simply turning the handle to expose the vote will secure the machine in its locked position, from which it cannot be reset until the lock has been opened. In the latter case in order to prevent any tampering with the handle 70 by an unauthorized person, I may use an auxiliary lock to hold it in its unlocked position during the voting operation of the machine. In this latter case, when the election is over, and it is desired to take the count off of the machine, I may open the auxiliary lock, which will allow the handle to be rotated, when, by rotating so that the arm 60 passes the spring lock, the machine will be held securely locked. The advantage of this last construction lies in the fact that, when the machine is thus locked, it cannot be unlocked, if the key to the spring lock is held by the city clerk or some other official independent of the judges or inspectors at their polling place.

Figure 10:
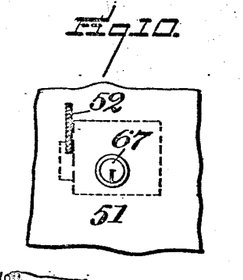
Fig. 10 is a front elevation of the portion of the machine in which the bar 52 goes, and in connection therewith a lock for holding it in its locking position.
Figure 11:
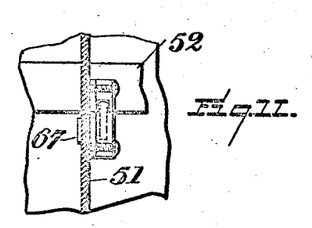
Fig. 11 is a cross section of the parts shown in Fig. 10.
Figure 12:
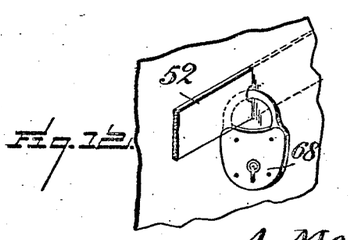
Fig. 12 is another means for holding the bar 52 in a position in which it holds the machine locked.
Figure 14:
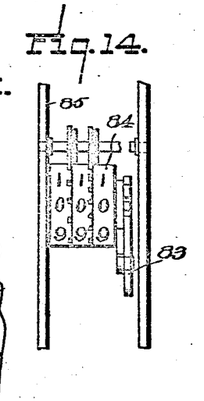
Fig. 14 is a detail view of the counter, showing the units, tens and hundreds wheels, and the manner of gearing the wheels together in the driving of the hundreds wheel by the tens wheel, and the tens wheel in turn by the units wheel.
Figure 15:
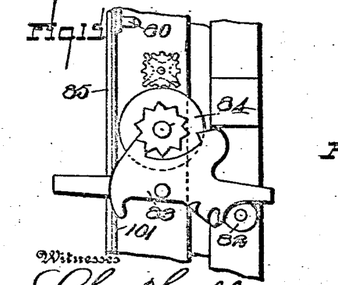
Fig. 15 is a detail view of the mutilated gear between each of the two consecutive wheels in the counter.
Figure 16:
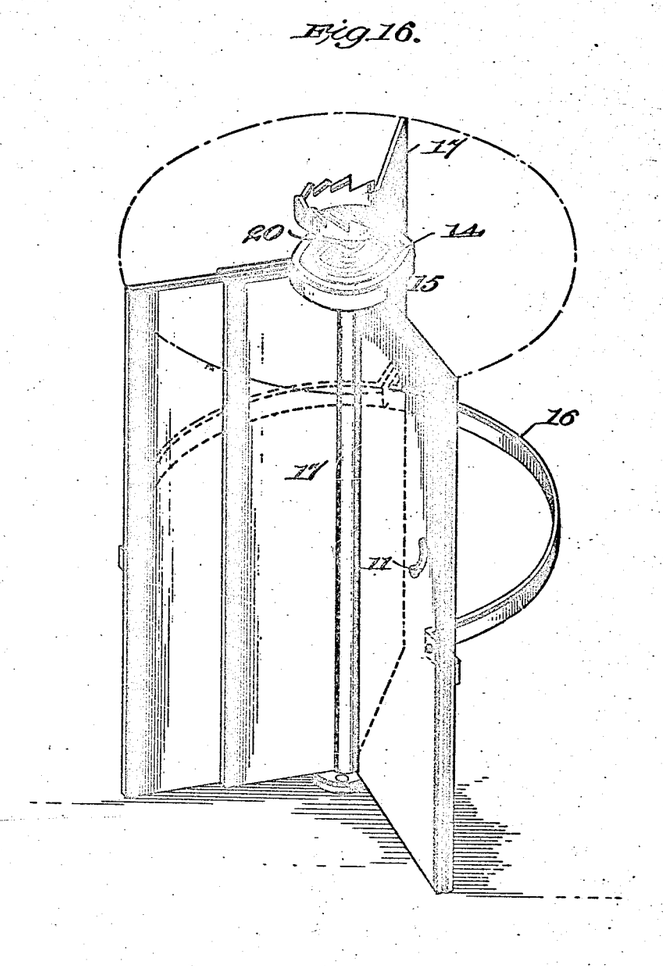
Fig. 16 is a perspective view of the turnstile.

In Figs. 10, 11 and 12, I show details, by means of which the voting mechanisms of the machine may be held locked at such time when it is not desired to inspect the counters of the machine. Fig. 10 is a front elevation of the top portion of the key-board of the machine through which the bar 52 passes, on the inside of which is shown, in dotted lines, a lock, with a key-hole 67 accessible from the front of the machine. The bar 52 has a slot in it, as is shown in Fig. 11, which, when the bar is pulled to the position in which it has locked the voting mechanisms, registers with the lip of the lock, in which position a key can be inserted in the key hole and the lock can be operated to hold the bar 52 securely in its position, thus securing the counters of the machine against fraudulent manipulation. In Fig. 12, I show another device for securing the same result, in which case I merely cut a hole through the bar 52 so that a spring padlock can be put through it and closed, which will then hold the bar in position which holds the voting mechanisms throughout the entire machine locked. The operation of my machine can readily be understood from the accompanying drawings. The voter pulls down on the voting key or counter-actuator 83 shown in Figs. 4 and 5 and raises the interlocking bar 65 and catches the dog 66 on the trip shaft 63, in which case he has voted. The counter need not be moved by this voting operation and, if desirable, to keep the counter from being moved, I may provide means which will prevent the depression of the key further than is necessary to engage the dog on the trip shaft, which is not sufficiently far to cause the rear pallet to engage with the star wheel and the voting key in this case will then have a one way engagement with the counter actuator, so that the voting key may be raised again, but it will not pull the counter actuator to its normal position. When the voter goes out of the booth, the trip shaft is rocked, after which the resetting bar is depressed and the interlocking rods are forced back to place. By the raising and depressing of the interlocking rods and counter actuator, which is incidental to this, the vote will be counted on the counters, and the pallet and the actuator will then be held securely and firmly in the position shown in both Figs. 4 and 5, preventing rotation of the rear star and units wheel of the counter.

The motion of the units wheel of the counter is transferred to the tens wheel by any preferred form of mutilated gear transfer mechanism, such as is shown in the first Davis patent above referred to, so that the tens wheel cannot be moved except through the units wheel, and the tens wheel in turn is geared to the hundreds wheel in the same way, so that, by locking the units wheel of the counter against rotation, the tens and hundreds wheel of the counter are locked against rotation. The counter wheels are further held against independent rotation by the channel in which they are carried. That is, it is impossible to spread the hundreds wheel from the tens wheel so that the gears connecting the two are out of mesh. which would then leave the hundreds wheel free to be rotated. This is true throughout the rest of the train of gears, consequently it would be impossible to rotate any of the wheels in this way. This means that when the units wheel is locked by the counter actuator all of the other wheels are securely locked along with it. The units wheel of the counter is locked by the train of mechanism which I am about to specify. The pallets of the counter actuator, 83, Figs. 4 and 5, engage with the star wheel, which star wheel is rigidly fastened to the units wheel of the counter so that the units wheel of the counter cannot be moved except by displacing the pallet from between the teeth of the star wheel. The counter actuator is held in its locked position through its interlocking rod, which is held in its locked position by the resetting bar, which, in turn, is held locked by the bell crank 77, 79 and bar 52, either by the cam on the turn stile or the lock shown in Fig. 6 or in Fig. 10, or by any or all of these, so that the counter is positively locked against movement, as are also the voting keys, counter actuators and interlocking rods.

Figures 9, 13:
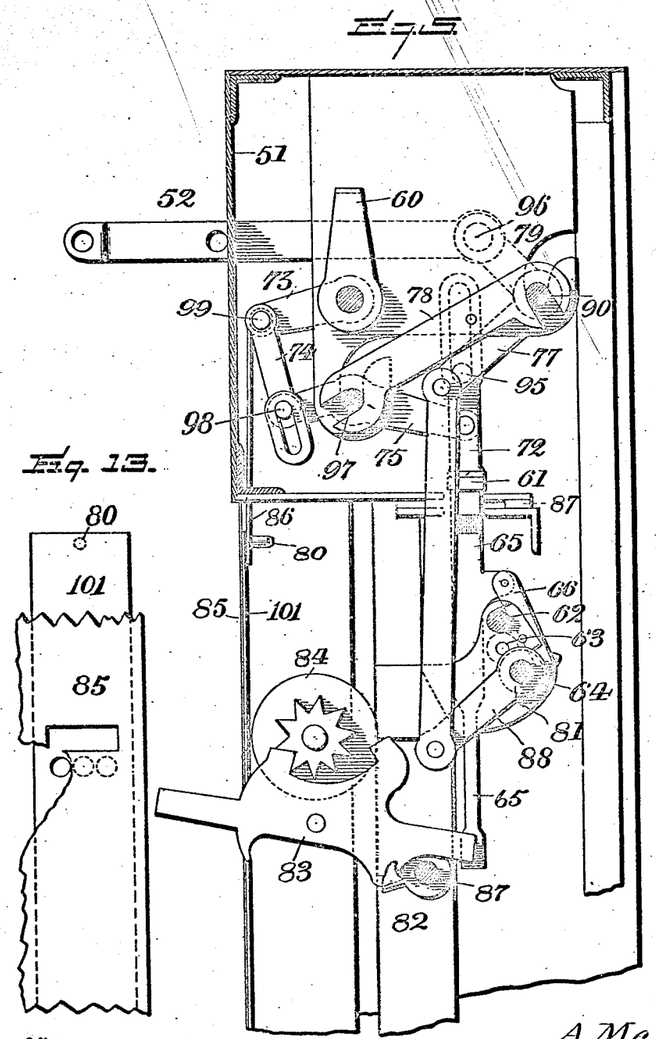
Fig. 9 is an elevation of the interlocking system, in which one of the interlocking rods is shown operated.
Fig. 13 is a front view, showing part of the casing or name plate and part of the counter concealing slide.
Figure 9:
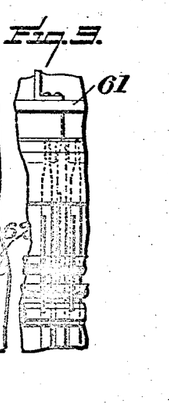

Figs. 8 and 9 show a plurality of interlocking rods, each one of which coöperates with the resetting locking bar to lock a separate counter, so that, in this way, any number of counters or all of the counters of the machine may be held securely locked against operation.

The names of the various offices and candidates therefor are secured to the casing or name plate 85 in any usual or preferred way.

It should be noted that the pallets on the voting key 83 are so placed with reference to the star wheel on the counter that the latter is continuously locked by the pallets, one of the pallets entering the circle in which the points of the star wheel lie before the other pallet leaves said circle.

It is obvious that many changes might be made without departing from the spirit of my invention and I wish it to be expressly understood that I do not limit myself to the exact details shown and described.

Having thus described my invention what I claim as new and desire to secure by Letters Patent is:

1. In a voting machine, the combination of counters, a barrier operative through intermediate mechanism to lock and unlock the counters as a voter passes said barrier to and from the machine, said mechanism including a single longitudinally reciprocating bar and a plate cam holding said counters locked during the interval of time between the passage by the barrier of one voter as he leaves the machine and the passage of another by said barrier on his approach to the machine.

2. In a voting machine, the combination of counters, counter-actuators therefor, a barrier operative through intermediate mechanism to lock and unlock the counters as a voter passes said barrier to and from the machine, said mechanism including a single longitudinally reciprocating bar and a plate cam holding said counters locked during the interval of time between the passage by the barrier of one voter as he leaves the machine and the passage of another by said barrier on his approach to the machine.

3. In a voting machine, the combination of voting keys, counter-actuators, counters, a barrier operative through intermediate mechanism to lock and unlock the counters as a voter passes said barrier to and from the machine, said mechanism including a single longitudinally reciprocating bar and a plate cam holding said counters locked during the interval of time between the passage by the barrier of one voter as he leaves the machine and the passage of another by said barrier on his approach to the machine.

4. In a voting machine, the combination of means for preventing a voter from obtaining access to the face of the machine except in a prescribed manner, counters, and mechanism for locking and unlocking said counters by the operation of a part of said means, said mechanism including a single longitudinally reciprocating bar and a plate cam holding said counters unlocked during that part of the operation of said preventing means which allows a voter to obtain access to the face of the machine and to hold said counters locked during the time that said preventing means will not permit a voter to obtain access to the face of the machine.

5. In a voting machine, the combination of counters, counter-actuators, a barrier operative through intermediate mechanism to lock and unlock the counters and counter-actuators as a voter passes said barrier to and from the machine, said mechanism including a single longitudinally-reciprocating bar and a plate cam holding said counters and counter-actuators locked during the interval of time between the passage of one voter by the barrier as he leaves the machine, and the passage of another by said barrier on his approach to the machine.

6. In a voting machine, the combination of keys, counter-actuators, counters, a barrier operative through intermediate mechanism to lock and unlock said keys, counter-actuators and counters as a voter passes said barrier to and from the machine, said mechanism including a single longitudinally reciprocating bar and a plate cam holding said keys, counter-actuators and counters locked during the interval of time between the passage by the barrier of one voter as he leaves the machine and the passage of another by said barrier on his approach to the machine.

7. In a voting machine, the combination of counters arranged in groups, interlocking mechanism therefor, a barrier operative through intermediate mechanism to lock and unlock the counters as a voter passes said barrier to and from the machine, said mechanism including a single longitudinally reciprocating bar and a plate cam holding said counters locked during the interval of time between the passage by the barrier of one voter as he leaves the machine and the passage of another by said barrier on his approach to the machine.

8. In a voting machine, the combination of counters arranged in groups, actuators therefor, interlocking mechanism, a barrier operative through intermediate mechanism to lock and unlock the counters and counter-actuators as a voter passes said barrier to and from the machine, said mechanism including a single longitudinally reciprocating bar, and a plate cam holding said counters and counter-actuators locked during the interval of time between the passage by the barrier of one voter as he leaves the machine, and the passage of another by said barrier on his approach to the machine.

9. In a voting machine, the combination of keys, counters and counter-actuators arranged in groups, interlocking mechanism, a barrier operative through intermediate mechanism to lock and unlock the keys, counter-actuators and counters as a voter passes said barrier to and from the machine, said mechanism including a single longitudinally reciprocating bar, and a plate cam holding said keys, counter-actuators and counters locked during the interval of time between the passage by the barrier of one voter as he leaves the machine, and the passage of another by said barrier on his approach to the machine.

10. In a voting machine, the combination of counters, each counter being composed of a train of wheels positively geared and locked with each other, so that the locking of the units wheel of a counter will lock the whole counter, a barrier operative through intermediate mechanism to lock and unlock the units wheels of the counters as a voter passes said barrier to and from the machine, said mechanism including a single longitudinally reciprocating bar, and a plate cam holding said units wheel locked during the interval of time between the passage by the barrier of one voter as he leaves the machine and the passage of another by said barrier on his approach to the machine.

11. In a voting machine, the combination of counters, a barrier operative through intermediate mechanism to lock and unlock the counters as a voter passes said barrier to and from the machine, said mechanism including a single longitudinally reciprocating bar, and a plate cam holding said counters locked during the interval of time between the passage by the barrier of one voter as he leaves the machine, and the passage of another by said barrier on his approach to the machine, said mechanism also acting to reset the machine.

12. In a voting machine, the combination of keys, counters and interlocking mechanism, and a single chain of mechanisms carried by said machine to hold all of said keys, counters and interlocking parts locked against relative movement while the machine is being moved from one place to another but leaving the movable parts accessible, substantially as described.

13. In a voting machine, the combination of keys, counters and interlocking mechanism with a casing supporting and containing said keys, counters and interlocking mechanism and a single chain of mechanisms carried by said casing to hold said keys, counters and interlocking mechanism locked against fraudulent movement while the machine is being moved from one place to another, substantially as described.

14. In a voting machine, the combination of a casing, counters therein, locking means for said counters preventing their movement in either direction, and a single chain of mechanisms carried by said casing for locking said locking means against movement, to prevent fraudulent manipulation of the machine, substantially as described.

15. In a voting machine, the combination of a casing, a single chain of locking mechanisms carried by said casing to prevent the operation of said counters in either direction and a lock forming a permanent part of the machine to hold said counter locking mechanisms in their locked position, substantially as described.

16. In a voting machine, the combination of counters, means for locking said counters against movement in either direction, means for exposing counters for inspection and means for simultaneously locking the counters and releasing the exposing means, substantially as described.

17. In a voting machine, the combination of a casing, counters therein for indicating the votes for each candidate, a single chain of locking mechanism, carried by said casing, to lock said counters against movement in either direction after each voter has cast his vote, and means for locking said locking mechanisms against movement after the last vote has been cast, substantially as described.

18. In a voting machine, the combination of counters, means for locking said counters against movement in either direction, and additional means on the frame of the machine which can be rotated to a locking position and secured in such position to prevent further voting, substantially as described.

19. In a voting machine, the combination of voting keys, counters, locking means for preventing the operation of said keys and counters, and a lock forming a permanent part of the machine to hold said means in its locked position, substantially as described.

20. In a voting machine, the combination of voting keys and counters, resetting means which are also adapted to hold said voting keys and counters locked against movement in either direction, and means for locking said resetting means in position to prevent movement of said voting keys and counters after the election is over, the locking means being carried on the machine casing, substantially as described.

21. In a voting machine, the combination of keys and counters, means for locking said keys and counters against movement in either direction, means by which the counters may be opened for inspection, and interlocking means between said two first-named means which prevent the movement of the keys while the counters are opened for inspection, substantially as described.

22. In a voting machine, the combination of keys and counters, means for locking said keys and counters against movement in either direction, means for exposing said counters for inspection, and means for simultaneously locking the counters and releasing the exposing means, substantially as described.

23. In a voting machine, the combination of keys and counters, means for locking said keys and counters against movement in either direction, an apertured shutter for opening said counters up for inspection, and means for preventing the operation of the shutter to open up the counters for inspection without locking said keys and counters against movement, substantially as described.

24. In a voting machine, the combination of a casing, counters therein and means carried by said casing for holding said counters unlocked immediately before, during, and immediately after the time when a voter is actually voting except such as have been actuated by the voter and for holding them locked against movement in either direction, at other times.

25. The combination in a voting machine with means for resetting and locking the voting mechanisms, of means for exposing the counters of said voting mechanisms, said resetting means and said counter-concealing means each carrying a part adapted to engage at certain times with the other so that the voting mechanisms must be locked before the counters can be exposed to view.

26. In a voting machine, the combination of a casing positively actuated counters therein, counter-actuators and keys, with means carried by said casing for holding said keys, counter-actuators and counters positively locked against movement in either direction at all times except when they are purposely unlocked to permit voting.

27. The combination, in a voting machine, of the voting mechanisms, including counters, with counter-concealing slides, and means preventing the operation of said slides thereof to expose the count except after the complete operation of the counters last preceding such exposure, whereby the record of the last vote is insured, said means positively actuating said slides in one direction, substantially as described.

28. In a voting machine, the combination, with a series of counters, with an actuator for each continuously interlocked therewith, operable in the plane of the units wheel thereof and preventing independent movement of the counter, a counter-concealing device movable to expose the count, and means in combination therewith to lock said actuators against operation, substantially as described.

29. The combination, with the continuously-interlocked counter and actuator, the counter-concealing slide movable to expose the count, and means to prevent the operation of the actuator and the counter until the counter is concealed, substantially as described.

30. The combination, with the continuously interlocked counter and actuator, the counter-concealing slide movable to expose the count, and means to prevent the operation of the actuator or the counter until the counter is concealed, and means for automatically liberating the actuator for operation after the counter is concealed, substantially as described.

31. A voting machine, substantially as herein described, having a name-plate and counter-concealing slides adapted for movement to expose the count and upon the position of which the operation of the counters is dependent, and positive connecting means between said slides and counters, substantially as described.

32. A voting machine comprising counters and associated mechanisms for several offices and candidates of different political parties, and provided with slides adapted for movement to expose the count, a bar common to said slides for moving the same, and means for preventing the movement of said bar.

33. A voting machine, substantially as herein described, having a name-plate and counter-concealing slides adapted for movement to expose the count and upon the position of which the operation of the counters is dependent, substantially as described.

34. In a voting machine, the combination of a frame having a perforated name-plate, counter-concealing slides adapted to cover and uncover the perforations in said name-plate, a bar to which said slides are connected, counters, means for locking said counters, and means for preventing the movement of said counter-concealing slides to expose the count until after the counters have been locked.

35. In a voting machine, the combination of counters, a casing containing said counters, means to prevent movement of said counters, a lock carried by the counter casing and coöperating therewith and with said means to prevent relative movement between the counter wheels and the casing.

36. The combination, with the counting mechanisms, of the locking mechanism therefor, the door concealing said counting mechanisms, and mechanisms preventing the opening of said door without first locking said counters, substantially as described.

In testimony whereof, I affix my signature, in presence of two witnesses.

ANGUS McKENZIE.

Witnesses:
J. N. HEGEMAN.
FRANK KEIPER.